(12) United States Patent
Way et al.

(10) Patent No.: US 7,912,911 B2
(45) Date of Patent: Mar. 22, 2011

(54) METHOD AND SYSTEM FOR INCREASING THROUGHPUT RATE BY DYNAMICALLY MODIFYING CONNECTION PARAMETERS

(75) Inventors: Richard Way, Berkeley Lake, GA (US); David Pullen, Buford, GA (US)

(73) Assignee: Broadcom Corporation, Irvine, CA (US)

( * ) Notice: Subject to any disclaimer, the term of this patent is extended or adjusted under 35 U.S.C. 154(b) by 428 days.

(21) Appl. No.: 11/892,521

(22) Filed: Aug. 23, 2007

(65) Prior Publication Data
US 2009/0055550 A1 Feb. 26, 2009

(51) Int. Cl.
*G06F 15/177* (2006.01)
(52) U.S. Cl. ......... 709/206; 709/233; 709/230; 370/229
(58) Field of Classification Search .................. 709/233, 709/206; 370/235, 236.1, 236.2
See application file for complete search history.

(56) References Cited

U.S. PATENT DOCUMENTS

| | | | |
|---|---|---|---|
| 5,193,151 A * | 3/1993 | Jain | 709/237 |
| 5,978,849 A * | 11/1999 | Khanna | 709/227 |
| 7,584,298 B2 * | 9/2009 | Klinker et al. | 709/238 |
| 2001/0029544 A1 * | 10/2001 | Cousins | 709/233 |
| 2002/0150048 A1 * | 10/2002 | Ha et al. | 370/231 |
| 2005/0102395 A1 * | 5/2005 | Falcon et al. | 709/224 |
| 2008/0229137 A1 * | 9/2008 | Samuels et al. | 713/600 |
| 2009/0055550 A1 * | 2/2009 | Way et al. | 709/233 |
| 2009/0213850 A1 * | 8/2009 | Viger et al. | 370/389 |

* cited by examiner

*Primary Examiner* — Wing F Chan
*Assistant Examiner* — Tesfay Yohannes
(74) *Attorney, Agent, or Firm* — Sterne, Kessler, Goldstein & Fox PLLC

(57) ABSTRACT

Methods, systems and computer program products for dynamically modifying at least one connection parameter between a client and a server connected via a network and thereby increasing throughput rate between the server and the client are provided.

The method comprises determining a first parameter value based on one or more characteristics of the network and a connection between the client and the server. The method further comprises determining whether a second parameter value encoded in a connection parameter field of the first packet received from the client is optimum based on a comparison with the first parameter value and overwriting the second parameter value with the first parameter value, if the second parameter value is not optimum.

30 Claims, 13 Drawing Sheets

METHOD AND SYSTEM FOR INCREASING THROUGHPUT RATE BY DYNAMICALLY MODIFYING CONNECTION PARAMETERS

BACKGROUND OF THE INVENTION

1. Field of the Invention

The present invention generally relates to communications systems.

2. Background Art

With bandwidth provided by cable modem and DSL services typically being 10 Mbps and higher, users are unable to take advantage of available bandwidth based on current connection parameters implemented by operating systems running on client devices (e.g. Personal Computers (PCs), wireless mobile devices such as Personal Digital Assistants (PDAs), cellular phones, etc). Additionally, DOCSIS 3.0 systems (with downstream channel bonding) and Very high speed Digital Subscriber Line (VDSL) deployments are able to provide much higher bandwidth than 10 Mbps. However, end users are even less able to take advantage of the high transmission rates offered by these services.

Methods and systems are needed to make better use of available bandwidth.

BRIEF SUMMARY OF THE INVENTION

Methods, systems and computer program products of dynamically modifying at least one connection parameter between a client and a server connected via a network and thereby increasing throughput rate between the server and the client are provided.

The method comprises determining a first parameter value based on one or more characteristics of the network and the connection between the client and the server. The method further comprises determining whether a second parameter value encoded in a connection parameter field of a first packet received from the client is optimum based on a comparison with the first parameter value and overwriting the second parameter value with the first parameter value, if the second parameter value is not optimum.

In an embodiment, the characteristics include a connection rate between the client and the server and a round-trip delay in the network. In an embodiment the first and second parameters are window size values. In an alternate embodiment the first parameter and second parameters are window scale values. In yet another embodiment, both window size and window scale values in the first packet may be modified. Parameters in subsequent packets sent between client and server may be similarly modified if required.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 5A:
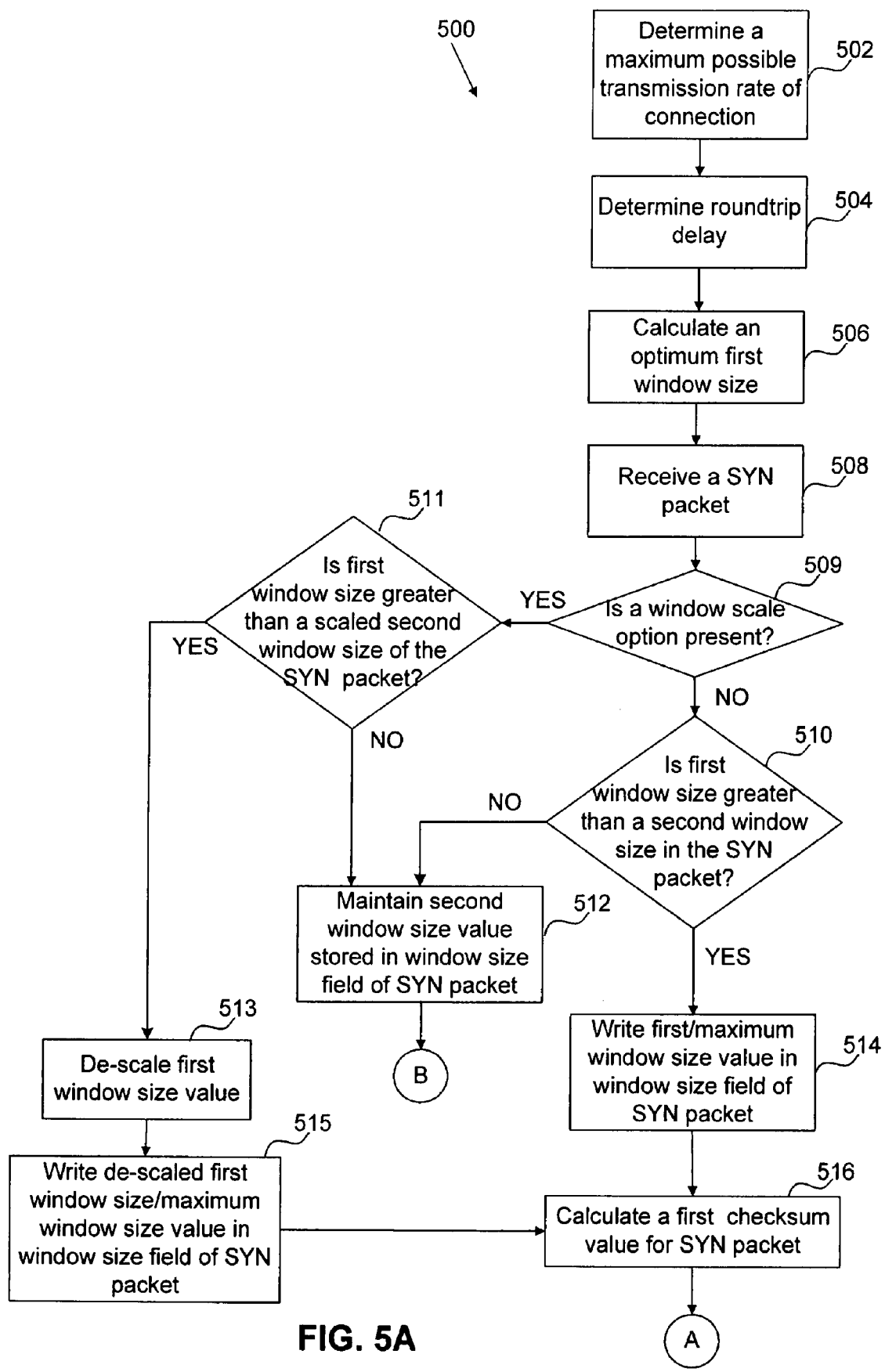
Figure 5B:
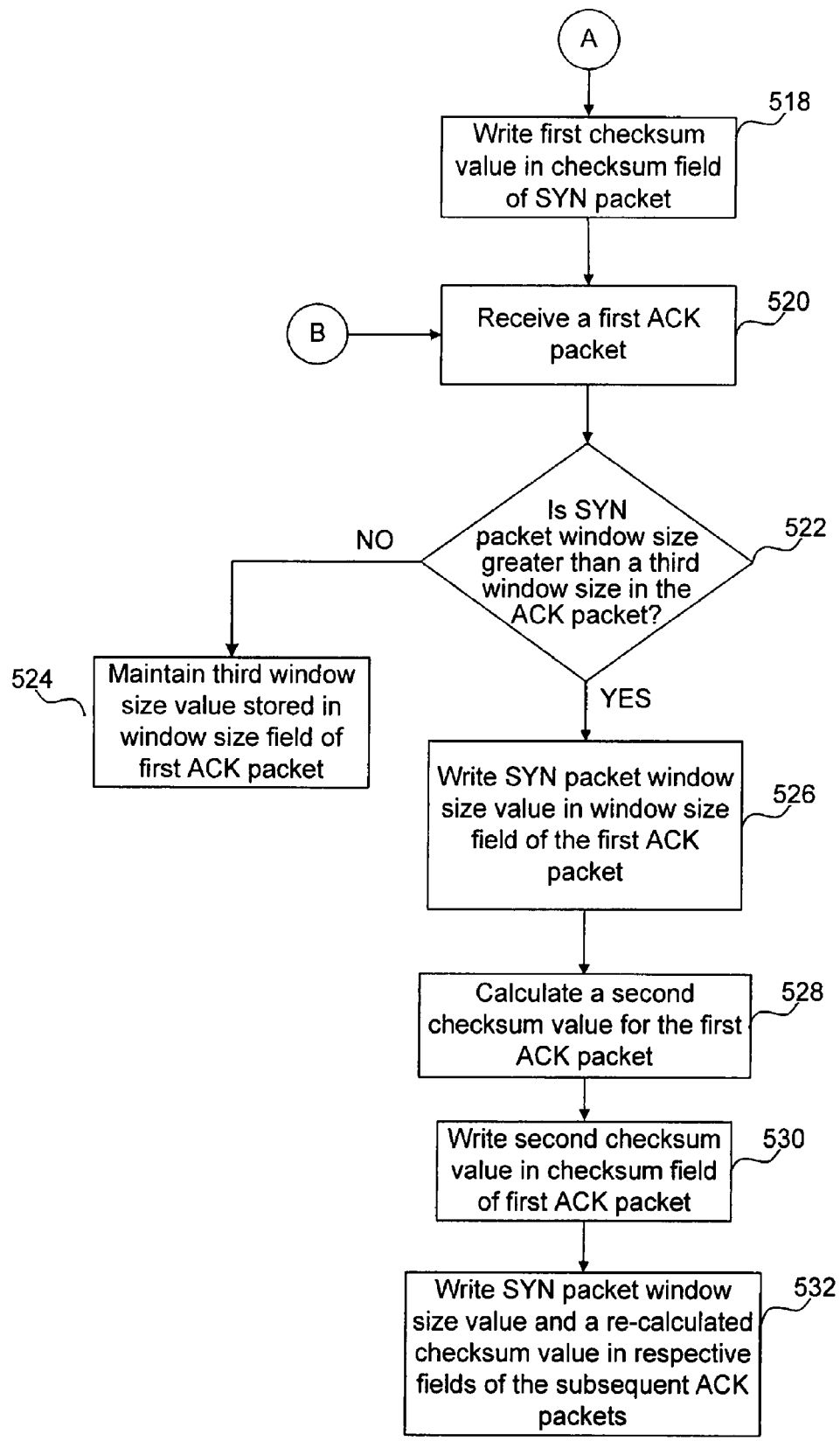

FIGS. 5A-B illustrate a flowchart of a method for dynamically modifying a window size field according to an embodiment of the invention.

Figure 6A:
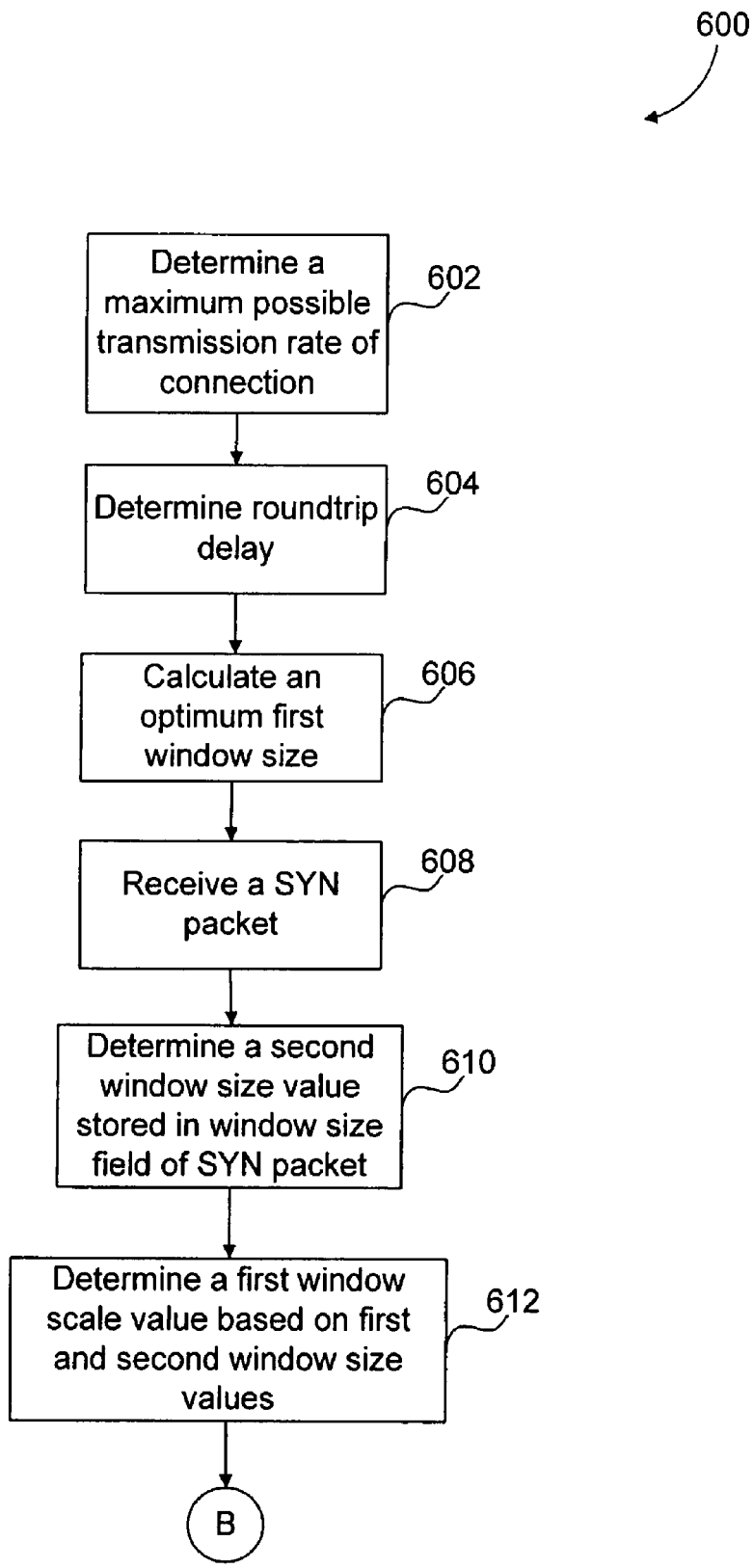
Figure 6B:
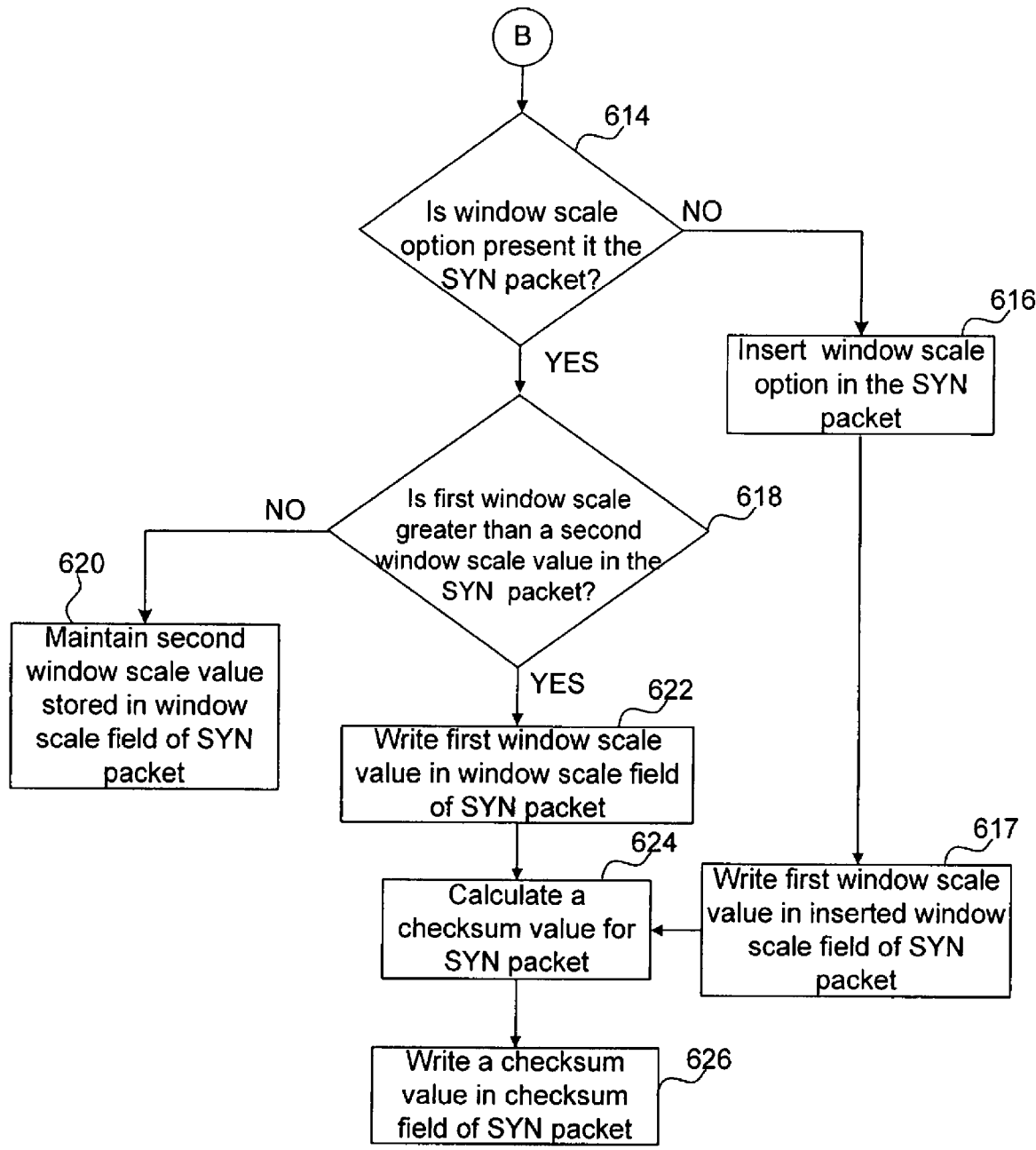

FIGS. 6A-B illustrate a flowchart of a method for dynamically modifying a window scale value according to an embodiment of the invention.

Figure 7A:
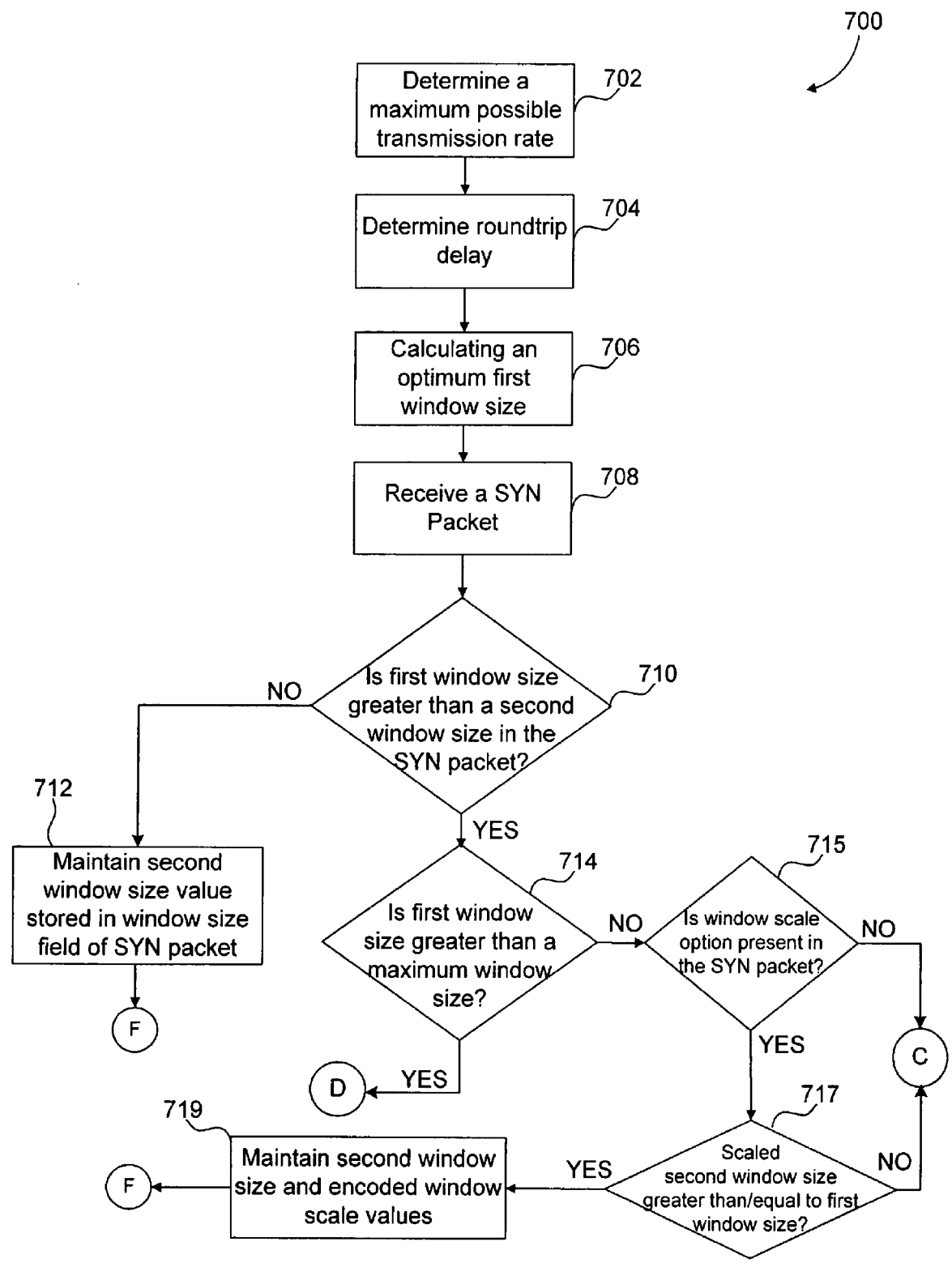
Figure 7B:
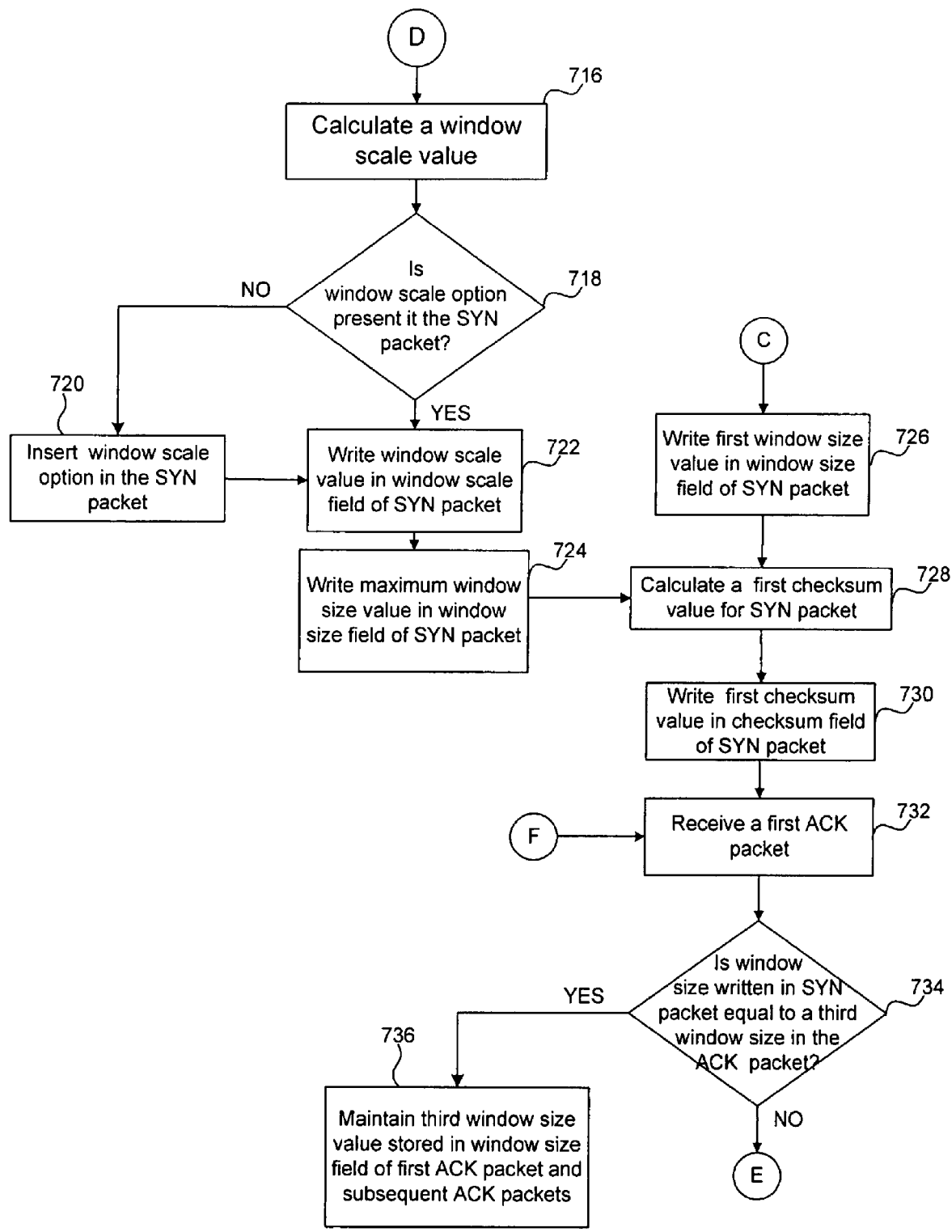
Figure 7C:
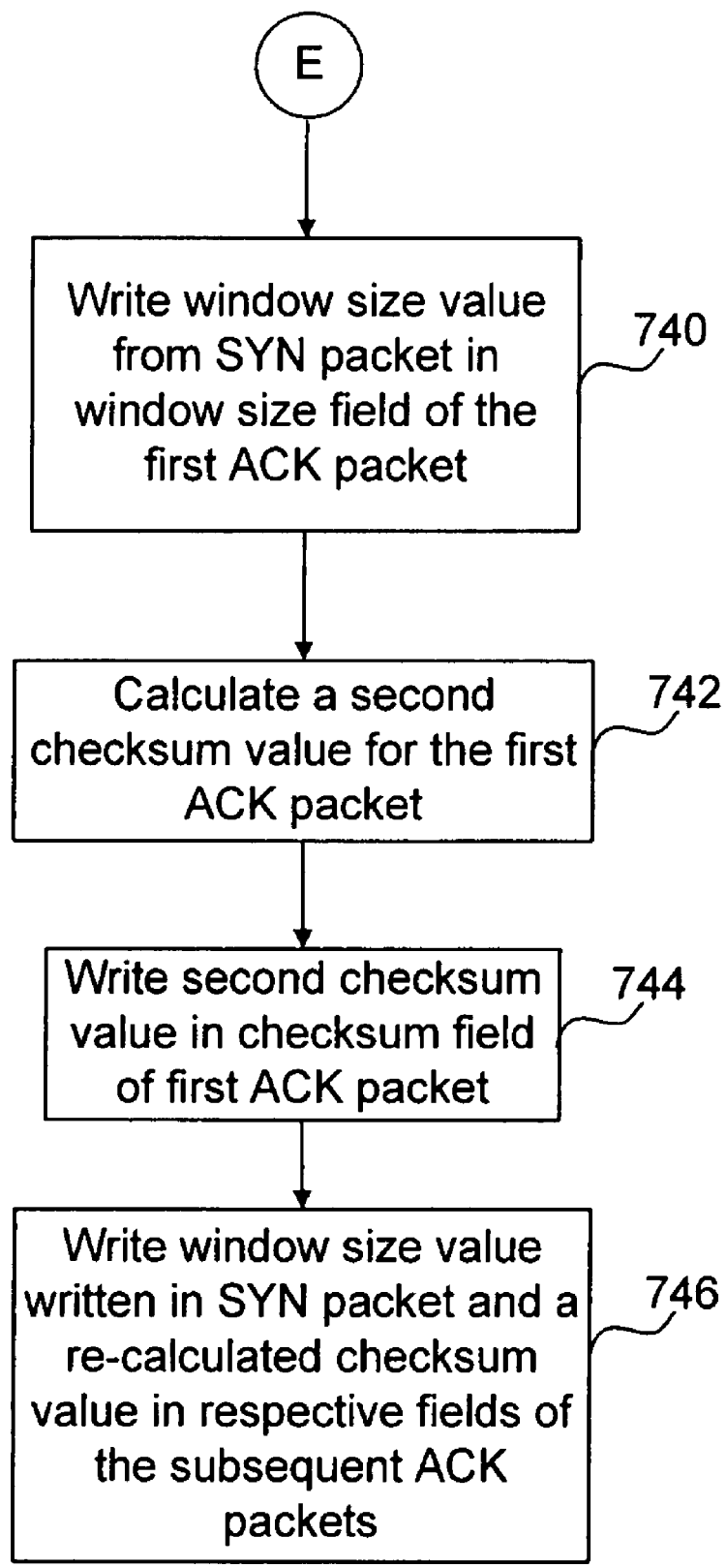

FIGS. 7A-C illustrate a flowchart of a method for dynamically modifying one or both of a window size value and a window scale value according to an embodiment of the invention.

Figure 8:
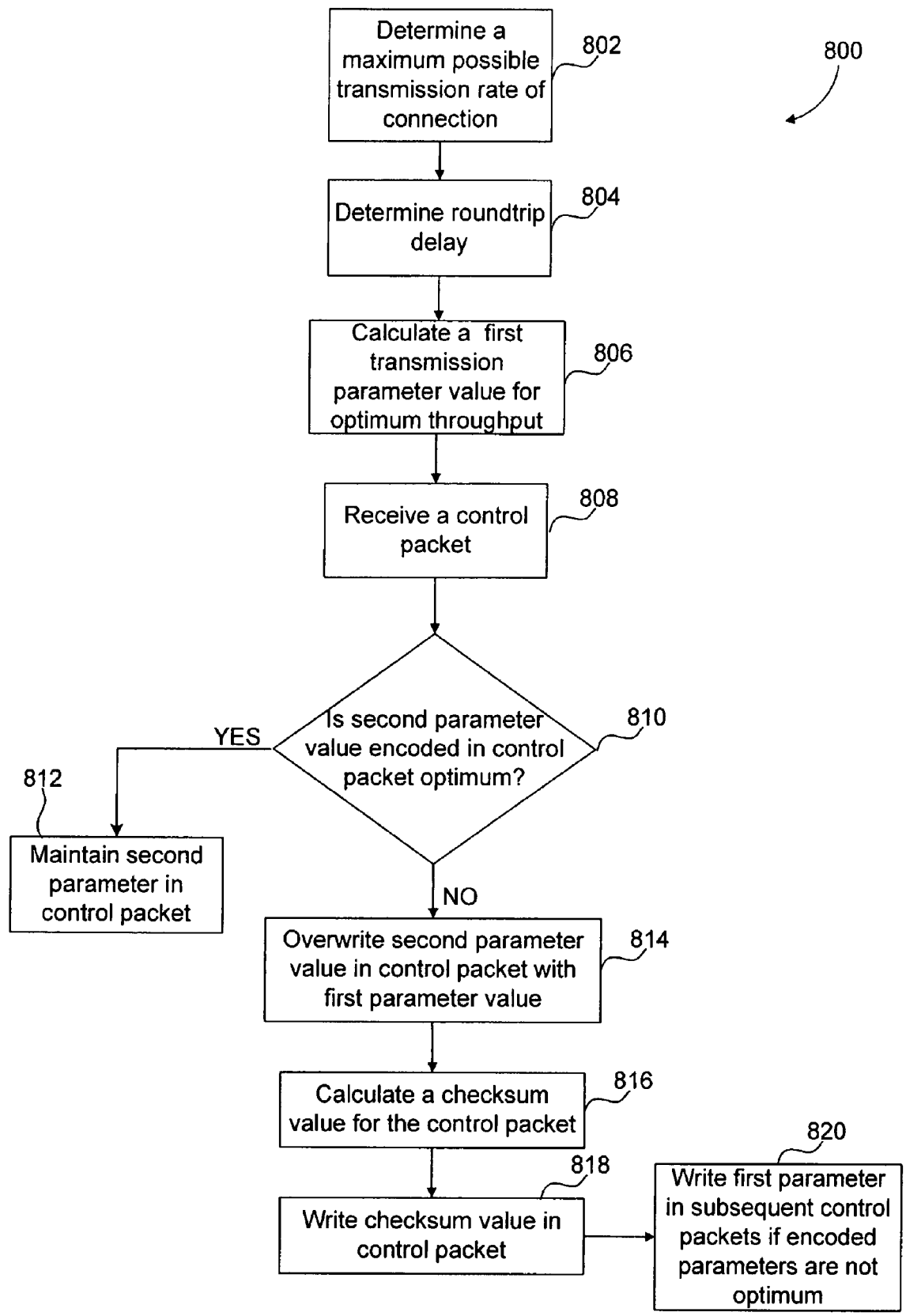

FIG. 8 illustrates a flowchart of a method for dynamically modifying one or more parameters in a control packet according to an embodiment of the invention.

Figure 9:
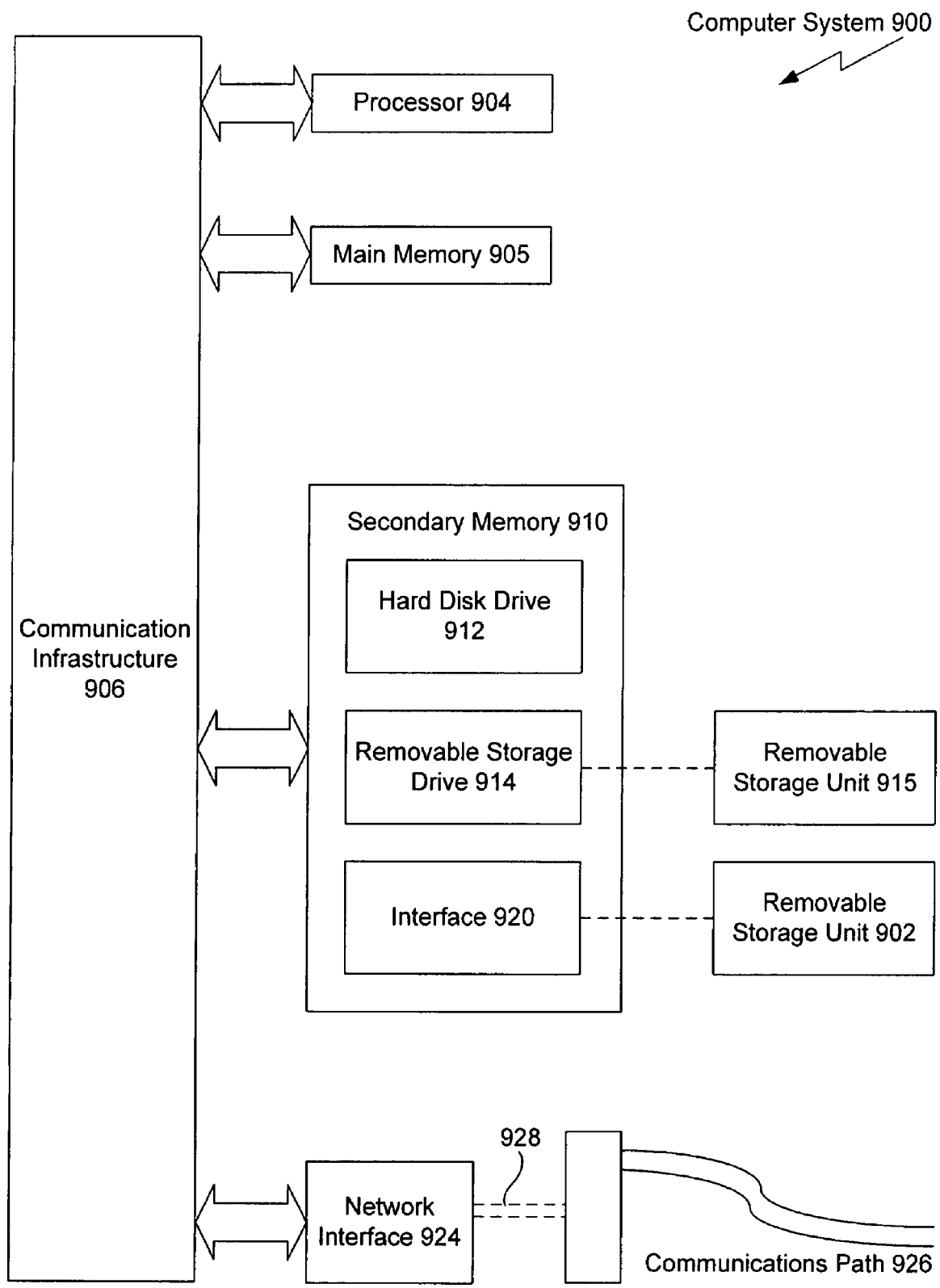

FIG. 9 is a block diagram of a computer system on which the present invention can be implemented.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

1. Overview
2. Example network architecture
3. Example Protocol Hierarchies
4. TCP header formats
5. Example Embodiments
   5a. Dynamic modification of window size
   5b. Dynamic modification of window scale
   5c. Dynamic modification of window size and window scale
   5d. Dynamic modification of parameters
   5e. DOCSIS embodiments
6. Example General Purpose Computer System
7. Conclusion

1. Overview

The present invention provides systems, methods and computer program products to enable a network device to dynamically modify one or more transmission parameters of a data or control packet sent from a client to a server or vice versa and thereby increase throughput between the client and the server.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

2. Example Network Architecture

Figure 1:
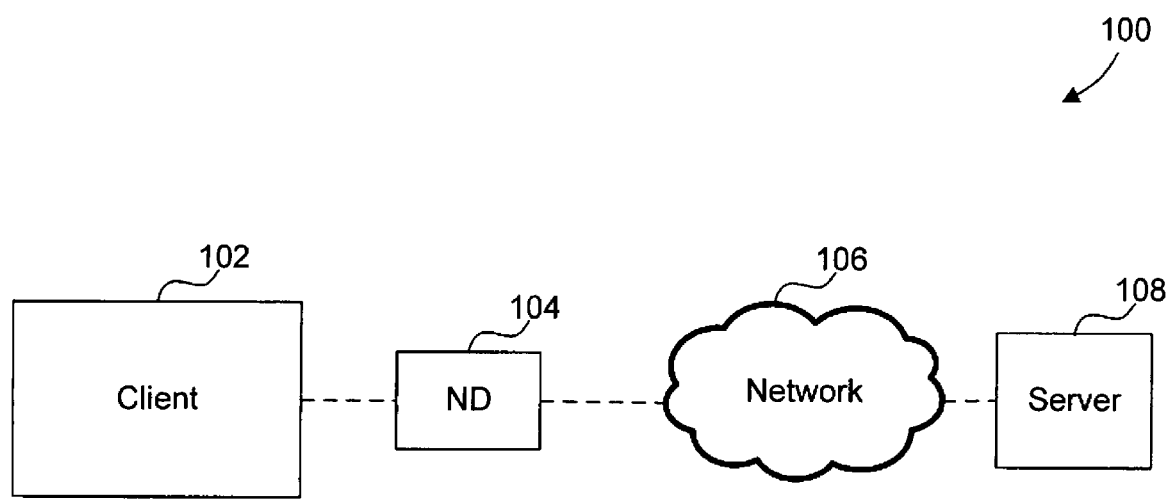
FIG. 1 illustrates an example network architecture.

FIG. 1 illustrates an example network architecture 100 comprising a client 102, a server 108, a network device 104 and a network 106. In system 100, client 102 may be a user's personal computer and server 108 may be an internet server. Client 102 requests data from server 108 or may upload data to server 108. Client 102 is connected to server 108 via a network 106 which may be a local area network (LAN), wide area network (WAN) or a Metropolitan Area Network (MAN). A transmission from client 102 to server 108 is considered an "upstream flow". A transmission from server 108 to client 102 is considered a "downstream flow". Network device 104 may be one of a Data Over Cable Service Interface Specification (DOCSIS) cable modem, router, switch, satellite modem, Digital Subscriber Line (DSL) modem, etc. FIG. 1 illustrates network device 104 as being located between client 102 and network 106, however, it is to be appreciated by persons of ordinary skill in the art that network device 104 may be located between network 106 and server 108, inside network 106 or anywhere in system 100. Network device 104 may be connected by wires, fiber optic cables or wirelessly to components in network 100. Furthermore, it is to be appreciated that system 100 may include multiple clients, servers and network devices. In an embodiment where system 100 is a peer-to-peer network, functions performed by client 102 and server 108 may be interchanged such that client 102 may function as a server and server 108 may function as a client.

Client 102 and server 108 operate on a client-server protocol in which server 108 listens for connections, usually on a specific port and one or more clients 102 connect to that specific port. An example of a client-server protocol is the Open Systems Interconnection (OSI) described below with reference to FIG. 2.

3. Example Protocol Hierarchies

Figure 2A:
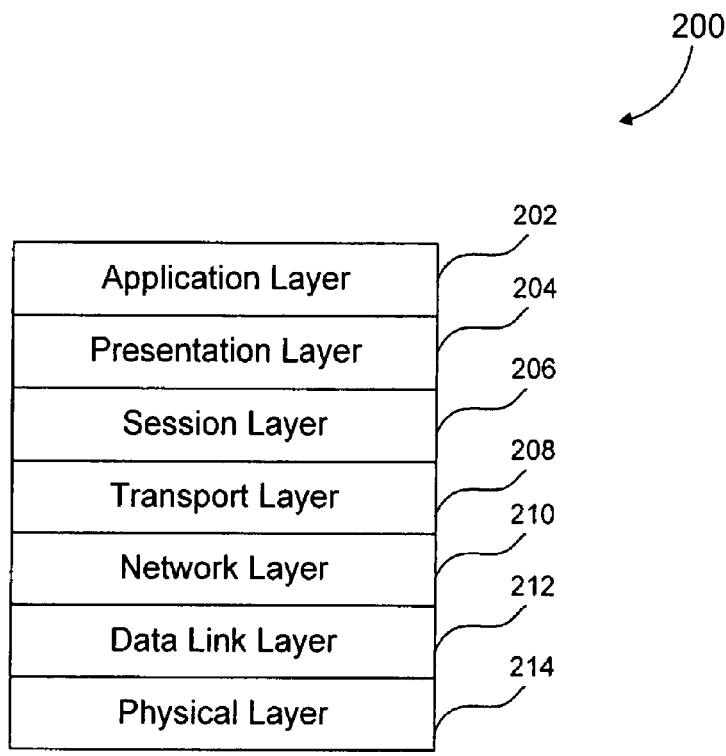
FIG. 2A illustrates an example Open Systems Interconnection (OSI) model.

FIG. 2A illustrates an example Open Systems Interconnection (OSI) model 200. OSI model 200 is a framework for implementing communication protocols in a hierarchy of seven layers: application layer 202, presentation layer 204, session layer 206, transport layer 208, network layer 210, data link layer 212 and physical layer 214.

Application layer 202 enables a user to access information on a network through an application or program. For example, a program running on client 102 uses commands to request data from a program running on server 108. Common functions at this layer are opening, closing, reading and writing files, transferring files and e-mail messages, executing remote jobs and obtaining directory information about network resources.

Presentation layer 204 provides a standard interface for the application layer 202. For data transmission between different types of computer systems, the presentation layer negotiates and manages the way data is represented and encoded.

Session layer 206 controls the dialogues/connections between computers. It establishes, manages and terminates connections between local applications and remote applications.

Transport layer 208 provides transparent transfer of data between end users, thus relieving the upper layers from any concern while providing reliable data transfer. An example of a network layer 210 is the Transmission Control Protocol (TCP).

Network layer 210 establishes the route between a sender and a receiver across switching points such as, for example, routers or other network devices 106. An example of a network layer 210 is the Internet Protocol (IP). An example TCP/IP reference model is described with reference to FIG. 2B below. TCP/IP headers are described with reference to FIG. 3 below.

Data link layer 212 is responsible for node to node validity and integrity of the transmission. Transmitted bits are divided into frames, for example, an Ethernet, Token Ring or FDDI frame in a network.

Physical layer 214 transmits and receives bits from a physical medium such as, for example, twisted pair Ethernet cables. Physical layer 214 deals with electrical and mechanical characteristics of signals and signaling methods.

Figure 2B:
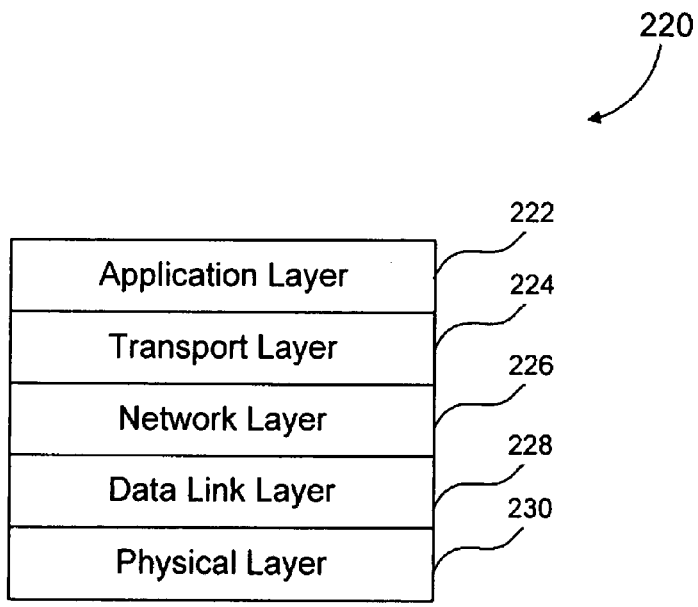
FIG. 2B illustrates an example Transmission Control Protocol/Internet Protocol (TCP/IP) model.

FIG. 2B illustrates a TCP/IP or Internet reference model 220 which is a layered abstract description for communications and computer network protocol design. TCP/IP model 220 is similar to OSI model 200 and comprises five layers: application layer 222, transport layer 224, network layer 226, data link layer 228 and physical layer 230.

Application layer 222 is where higher level protocols such as SMTP, FTP, SSH, HTTP, etc. operate. The application layer is used by most programs for network communication. Data is passed from the program in an application-specific format, then encapsulated into a transport layer protocol.

Transport layer 224 is where flow-control and connection protocols exist, such as TCP. This layer deals with opening and maintaining connections, ensuring that packets are in fact received. The transport layer's responsibilities include end-to-end message transfer capabilities independent of the underlying network, along with error control, fragmentation and flow control. End to end message transmission or connecting applications at the transport layer can be categorized as either: connection-oriented e.g. TCP or connectionless e.g UDP.

Network, internet or internetworking layer 226 defines IP addresses, with many routing schemes for navigating packets from one IP address to another.

Data link layer 228 is the method used to move packets from the network layer on two different hosts, is not part of the Internet protocol suite, because IP can run over a variety of different link layers.

Physical layer 230 describes the physical equipment necessary for communications, such as twisted pair Ethernet cables, the signaling used on that equipment, and the low-level protocols using that signaling. The Physical layer is responsible for encoding and transmission of data over network communications media.

Packets sent in a network operating on the TCP/IP protocol require specific header formats as described below.

4. TCP Header Formats

Figure 3:
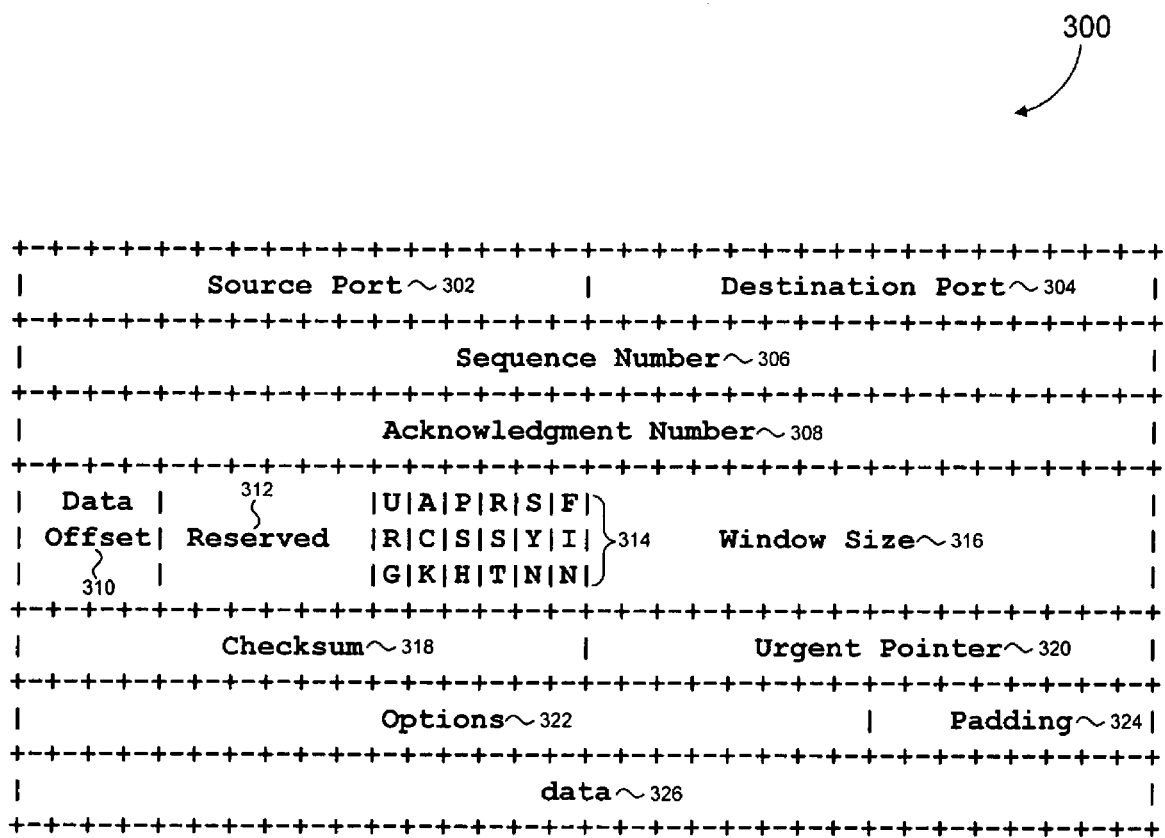
FIG. 3 illustrates TCP header 300 according to the Request For Comments (RFC) 793 specification.

FIG. 3 illustrates TCP header 300 according to the Request For Comments (RFC) 793 specification. TCP header 300 comprises source port field 302, destination port field 304, sequence number field 306, acknowledgement number field 308, data offset field 310, reserved field 312, control field 314, window size field 316, checksum field 318, urgent pointer field 320, options field 322, padding field 324 and data field 326.

Source port field 302 is used to encode a source port number and destination port 304 is used to encode a destination port number.

Sequence number field 306 is used to encode a sequence number of the first data octet in a segment except for synchronization (SYN) packets where the SYN bit is set in control field 314.

Data Offset field 310 is used to encode the number of 32 bit words in TCP header 300. This indicates where the data begins. TCP header 300 is an integral number of 32 bits long.

Reserved field 312 is reserved for future use and is typically set to zero.

Control field 314 is used to encode an Urgent Pointer (URG) field significant, Acknowledgment (ACK) field, push function (PSH), Reset the connection (RST), Synchronize sequence numbers (SYN) and stop data from sender (FIN) options. Typically a bit is set to indicate presence of each option.

Window size field 316 is used to encode the number of data octets beginning with the one indicated in the acknowledgment field which the sender of this segment is willing to accept. TCP defines the window size field 316 to be 16 bits which allows a maximum value of 65,535 to be encoded in it.

Checksum field 318 is used to encode a 16 bit one's complement of the one's complement sum of all 16 bit words in the header (including IP pseudo-header) and text.

Urgent Pointer field 320 is used to encode the current value of the urgent pointer as a positive offset from the sequence number in a current segment. The urgent pointer value points to the sequence number of the octet following the urgent data. This field is only be interpreted in segments with the URG control bit set in control field 314.

Options field 322 is at the end of TCP header 300 and is a multiple of 8 bits in length. An option may begin on any octet boundary. Options include but are not limited to: End-of-option list, No-Operation and Maximum Segment Size.

Padding field 324 is used to ensure that the TCP header 300 ends and data begins on a 32 bit boundary. The padding is composed of zeros.

Data field 326 is used to encode data for a TCP packet.

Figure 4:
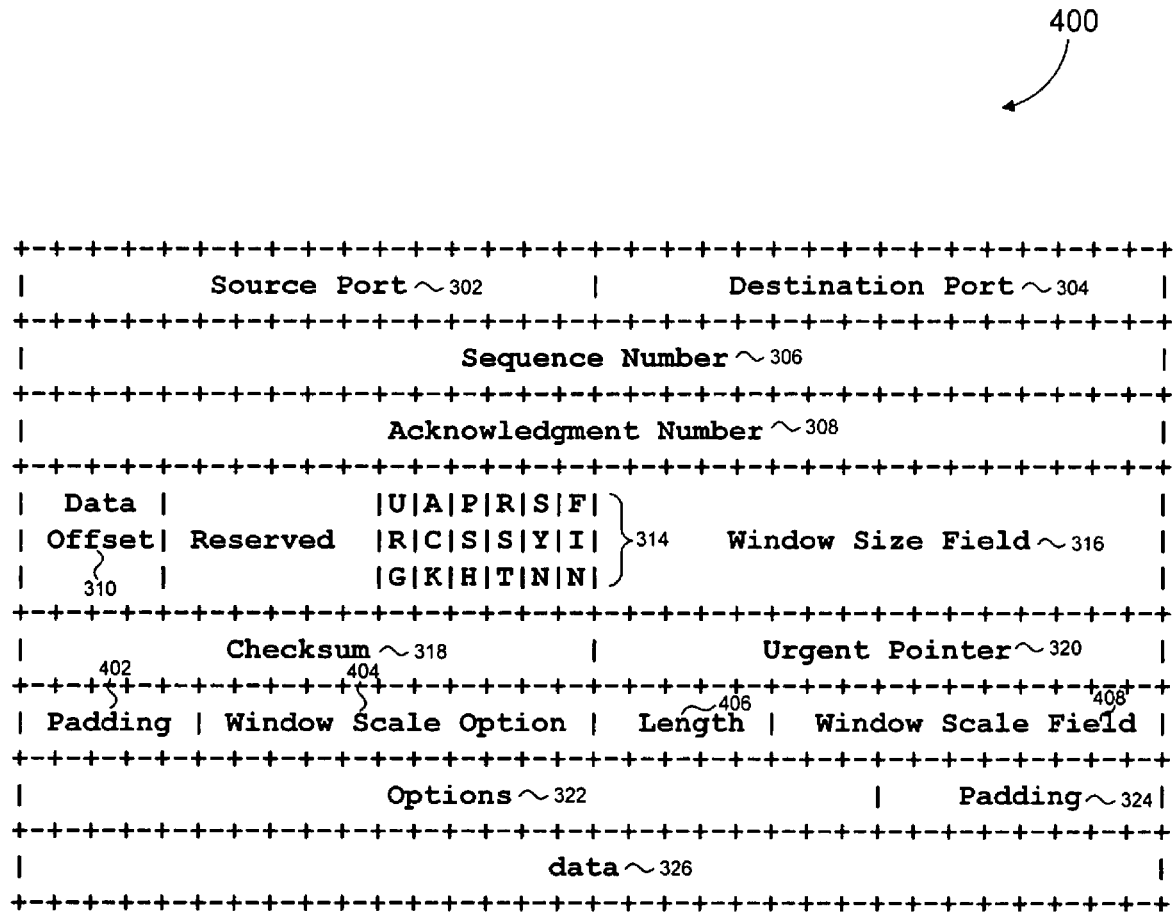
FIG. 4 illustrates TCP header 400 according to the RFC 1323 specification.

FIG. 4 illustrates TCP header 400 according to the Request For Comments (RFC) 1323 specification. TCP header 400 includes, in addition to the fields present in header 300, a padding field 402, a window scale option field 404, a length field 406 and a window scale field 408.

Padding field 402 is used to pad window scale option field 404. The padding is composed of zeros.

Window scale option field 404 is used to encode a value to indicate whether window scale field 408 is present in header 400. Window Scale option field 404 is only present in a SYN packet (i.e. a packet which has the SYN bit set in control field 314). Window scale option field 404 is used to indicate that a client 102 can both send and receive window scaling. This field also communicates that a scale factor in window scale field 408 is to be applied to its receive window size encoded in window size field 316.

Length field 406 is used to encode a value to indicate the size of fields window scale option 404, length 406 and window scale 408.

Window scale field 408 is provided by RFC 1323 to extend TCP window size value in window size field 316 from 16 bits to 32 bits using window scale value 408. Window scale value 408 is sent only in a SYN packet. The window scale value is encoded in window scale field 408 of a SYN packet when the connection is established between client 102 and server 108. The value encoded in the window scale field 408 determines the scaling that will be applied to the value encoded in the window size field 316 for the duration of the connection session between client 102 and server 108. This has the advantage of lower processing overhead (since only the first packet (e.g. SYN packet) of a connection needs to be processed by network device 104) but the disadvantage that the scale factor encoded in window scale field 408 cannot be changed during the life of the connection. The scale factor encoded in window scale field 408 is limited to a power of two and encoded logarithmically, so it may be implemented by binary shift operations.

5. Example Embodiments

The amount of throughput that can be achieved via a TCP connection between client 102 and server 108 is based on a number of parameters. With high-bandwidth services provided by DSL, Cable Modems internet, WiFi, satellite internet, etc., TCP connection parameters such as window size and window scale value cause bottlenecks in the throughput rate between client 102 and server 108.

With a TCP connection on a high-bandwidth link, throughput rate between client 102 and server 108 is limited by the TCP Window Size and the round trip delay in network 106.

The throughput between client 102 and server 108 is given by:

$$\text{Throughput(bps)} = (\text{WindowSize(Bytes)} * 8)) / \text{roundTripDelay(Sec)} \qquad \text{equation 1}$$

The TCP window size value implemented by a client 102 depends on the OS implementation. Examples of window size values typically implemented by various operating systems:

Windows 95/98/98SE/NT—8 kB window size
Windows ME/2000/XP—16 kB window size
Linux Redhat 9—32 kB window size A client 102 running Macintosh operating system typically implements the TCP window size as 33,304 bytes. If the round trip delay in network 106 is 200 ms, then throughput between client 102 and server 108 is given by:

$$\text{Throughput(bps)} = (33,304*8)/0.2 = 1,332,160 \text{ bps} \qquad \text{equation 2}$$

A client 102 running Windows XP SP2 operating system typically implements the TCP window size as 65,535 bytes. If the round trip delay in network 106 is 200 ms, then throughput in bps between client 102 and server 108 is given by:

$$\text{Throughput(bps)} = (65,535*8)/0.2 = 2,621,400 \text{ bps} \qquad \text{equation 3}$$

With bandwidth provided by cable modem and DSL services typically being 10 Mbps and higher, users are unable to take advantage of available bandwidth with current window size values implemented by the operating systems running on clients 102. Additionally, DOCSIS 3.0 systems (with downstream channel bonding) and Very high speed Digital Subscriber Line (VDSL) deployments are able to provide higher bandwidth than 10 Mbps.

When the operating system running on client 102 establishes a TCP connection with server 108, client 102 sends a TCP SYN packet. Typically, if an operating system running on client 102 has a RFC 793 implementation then the TCP SYN packet generated by client 102 contains only the window size field 316. Typically, if an operating system running on client 102 has an RFC 1323 option enabled in its registry then a TCP SYN packet generated by client 102 contains both the window size field 316 and the window scale field 408. All TCP ACK packets which are sent subsequent to a TCP SYN packet have a window size field 316, regardless of whether RFC 793 or RFC 1323 is implemented by the operating system running on client 102.

The maximum value that an OS can encode in the TCP window size field 316, as defined by the current TCP standard, is 65,535 bytes since window size field 316 is a 16 bit field. RFC 1323 defines the window scale value 408 to be specified in a TCP header 400 which is an arithmetic shift left amount where a value of 1 yields a multiplier of 2, a value of 2 yields a multiplier of 4, etc. However, most operating systems encode a window scale value of 0 if window scale field 408 is present in the TCP header. Furthermore, most operating systems do not even encode a maximum value in window size field 316.

Modifying operating system parameters or registry settings to maximize window size value and/or encode the window scale value at client 102 end can render client 102 inoperable due to system corruption. Therefore what is needed is a method and a system to dynamically optimize the TCP connection parameters, without incurring the risks associated with modifying core operating parameters or registry settings on client 102.

According to an embodiment of the invention, network devices 104 such as Cable Modems (CMs), Cable Modem Termination Systems (CMTSs), Digital Subscriber Link (DSL) modems, satellite modems, WiFi access points, routers, etc., are enabled to modify TCP connection parameters in control packets sent from client 102 to server 108 (to increase downstream throughput) or control packets sent from server 108 to client 102 (to increase upstream throughput). Packets can be changed dynamically or on-the-fly within network device 104 thereby allowing a client's operating system configuration to be unchanged while increasing throughput between client 102 and server 108 or between server 108 and client 102.

It is to be appreciated by persons of skill in the art that the embodiments disclosed herein also apply to connections that transfer data from client 102 to server 108 in the upstream direction. For example, for networking topologies such as DOCSIS 3.0 upstream channel bonding, Fiber Optic Service (FIOS) etc., upstream bandwidth can exceed 5 Mbps and transmission parameters may be modified to increase throughput in the upstream direction. Embodiments presented below describe modification of connection parameters to increase throughput of data sent from server 108 to client 102 in the downstream direction.

5a. Dynamic Window Size Modification

When a client 102 establishes a TCP connection with a server 108, it sends a TCP SYN packet which has window size field 316. According to an embodiment, network device 104 intercepts the TCP SYN packet being sent from client 102 to server 108. Network device 104 modifies a value encoded in a window size field 316 of the SYN packet, if the encoded value is sub-optimal, modifying it such that it increases throughput of data from server 108 to client 102 when compared with the previously encoded value in window size field 108. The optimum window size value is a function of the maximum possible data rate of the connection between client 102 and server 108 and the round trip delay in network 106.

The round-trip delay is measured by network device 104 via various mechanisms, for example, Internet Control Message Protocol (ICMP) ping, round-trip time measurement (RTTM), TCP Timestamp Option etc. Round-trip delay may also be estimated based on topology information of network 106 garnered by network device 104. Alternatively, round-trip delay may be provisioned or programmed by external entities e.g. via a configuration file or entered via a configuration web page, etc.

The maximum possible data rate (connection speed/rate) between client 102 and server 108 is determined, for example, based on a configuration file sent by server 108 to network device 104 that specifies maximum possible upstream and downstream connection speeds. Alternatively, connection speed between client 102 and server 108 may be determined by measurements made by network device 104 or pre-existing knowledge of network physical parameters.

The optimum window size value to be encoded in window size field 316 is given by:

$$\text{Optimum\_Window\_Size(bytes)} = (\text{Connection\_Speed (bps)}/8) * \text{roundTripDelay(sec)} \quad \text{equation 4}$$

For example, if a maximum possible data rate between client 102 and server 108 is 1 Mbps and roundtrip delay in network 106 is 200 ms then optimum window size is:

$$\text{Optimum\_Window\_Size(bytes)} = (1,000,000/8) * 0.2 = 25,000 \text{ bytes} \quad \text{equation 5}$$

Optimum window size of 25,000 bytes is less than the maximum possible value of 65,535 bytes that can be encoded in window size field 316. Hence network device encodes 25,000 in window size field 316. However, if the optimum window size is greater than the maximum possible window size value 65,535 bytes, then the maximum possible window size of 65,535 is encoded in window size field 316. For example, if a maximum possible data rate between client 102 and server 108 is 10 Mbps and roundtrip delay in network 106 is 200 ms then optimum window size is:

$$\text{Optimum\_Window\_Size} = (10,000,000/8) * 0.2 = 250,000 \text{ bytes} \quad \text{equation 6}$$

In this case, since optimum window size value of 250,000 is greater than maximum window size of 65,535, maximum window size of 65,535 is encoded in window size field 316. Since the encoded maximum window size value of 65,535 is less than the optimum value of 250,000, client 102 will have increased throughput but not be able to achieve the maximum of 10 Mbps throughput.

The value in checksum field 318 is also modified in order to accommodate the change to the value in window size field 316.

Any ACK packets received by network device 104 subsequent to the SYN packet are examined to determine whether they have a sub-optimal value encoded in window size field 316. If the ACK packets have a sub-optimal window size value, then the window size value encoded in the SYN packet is also encoded in the window size field 316 of the ACK packets. If a window scale value was encoded by the client in the SYN packet, then network device 104 scales the window size in the SYN packet by the scale value before comparing it to the encoded value in the ACK packet. In this case, network device 104 de-scales the encoded window size that was written in the SYN packet by the scale value before writing it in the window size field of the ACK packet. Similar modifications are made to any subsequent ACK packets.

The value in checksum field 318 of the ACK packets is also recalculated to accommodate the change to the value in window size field 316. In an alternate embodiment, network device 104 checks ACK packets coming from client 102 to determine whether the client has decreased the window size value in subsequent ACK packets below a predetermined threshold. If the subsequent ACK packets have a decreased window size value, then in this embodiment network device 104 does not overwrite the window size value encoded in the subsequent ACK packets with the window size value encoded in the SYN packet. This allows client 102 to continue using the window size value for flow control if it desires to do so.

FIGS. 5A-B illustrate a flowchart 500 of a method for dynamically modifying a window size value using a network device and thereby increasing throughput between a server and a client according to an embodiment of the invention. Flowchart 500 will be described with continued reference to the example operating environment depicted in FIG. 1. In an embodiment, the steps illustrated in FIG. 5A are performed by network device 104 illustrated in FIG. 1. However, the flowchart is not limited to that embodiment. Note that some steps shown in flowchart 500 do not necessarily have to occur in the order shown.

In step 502, a connection rate is determined. For example, network device 104 determines a connection rate between client 102 and server 108.

In step 504, a round-trip delay time is determined. For example, network device 104 determines the round-trip delay time between client 102 and server 108.

In step 506, a first window size is calculated based on the connection rate and the round-trip delay as described above. For example, network device 104 determines the first window size based on the connection rate and round-trip delay time.

In step 508, a SYN packet is received. For example, network device 104 receives a SYN packet from client 102.

In step 509 it is determined whether a window scaling option is present in the SYN packet. For example, network device 104 determines whether a window scaling option is present in the SYN packet by examining whether the header of the SYN packet has a window scale field. If it is determined that a window scale option is not present in the SYN packet, control proceeds to step 510.

In step 511, if it is determined that a window scale option is present in the SYN packet in step 509, it is determined whether the first window size is greater than a second window size value in the SYN packet scaled by a scale value also encoded in the SYN packet. For example, network device 104 scales the second window size value by the window scale value and determines whether the first window size is greater than the scaled second window size. If it is determined that the first window size is not greater than the scaled second window size then control proceeds to step 512.

In step 513, if it is determined that the first window size value is greater than the scaled second window size in step 511, the first window size value is de-scaled by the encoded window scale value and control proceeds to step 515. For example, network device 104 de-scales the first window size by the encoded window scale value.

In step 515, the de-scaled first window size is written in the window size field of the SYN packet. If the de-scaled first window size is greater than the maximum window size, then the maximum window size is written in the window size field of the SYN packet. For example, if first window size value is 14,000 bytes and the window scale value is 2, then the de-scaled first window size is 7,000. If the maximum possible window size value is 65,535 bytes, then 7,000 is encoded in window size field. If the first window size is 140,000 and the encoded window scale factor is again 2, then the de-scaled first window size is 70,000 which is greater than the maximum window size value of 65,535. In this case the maximum window size of 65,535 is written in the window size field. For example, network device 104 overwrites the second window size value in the window size field of the SYN packet with either the de-scaled first window size value or the maximum window size value.

In step 510, it is determined whether the first window size value calculated in step 506 is greater than a second window size value encoded in a window size field of the SYN packet received in step 508. For example, network device 104 determines whether the first window size value is greater than the second window size value encoded in the window size field of the SYN packet. If it is determined that the first window size is not greater than the second window size then control proceeds to step 512. If it is determined that the first window size value is greater than the second window size value then control proceeds to step 514.

In step 512, the second window size is left unchanged in the window size field of the SYN packet. Control proceeds to step 520.

In step 514, the second window size value in the window size field of the SYN packet is overwritten with either the first window size value or the maximum window size value. If the first window size value is greater than the maximum window size value then the maximum window size value is written in the window size value, otherwise the first window size is written in the window size field. For example, if first window size value is 25,000 bytes and the maximum possible window size value is 65,535 bytes, then 25,000 is encoded in window size field. If the first window size is 250,000 and the maximum window size value is again 65,535, then 65,535 is written in the window size field. For example, network device 104 overwrites the second window size value in the window size field of the SYN packet with either the first window size value or the maximum window size value if it is determined that the first window size value is greater than the second window size value.

In step 516, a first checksum value is calculated for the SYN packet. For example, network device 104 calculates the first checksum value for the SYN packet since the window size value encoded in the window size field of the SYN packet is modified in step 514 or step 515.

The steps of flowchart 500 are continued in FIG. 5B and are described below.

In step 518, the first checksum value is encoded in the checksum field of the SYN packet by overwriting the stored checksum value. For example, network device 104 writes the first checksum value in the checksum field of the SYN packet.

In step 520, a first ACK packet is received. For example, network device 104 receives a first ACK packet from client 102.

In step 522, it is determined whether the window size value encoded in SYN packet in step 514 or step 515 is greater than a third window size value encoded in a window size field of the first ACK packet received in step 520. For example, network device 104 determines whether the encoded SYN packet window size value is greater than the third window size value encoded in the first ACK packet. If a window scale value was encoded by the client in the SYN packet, then network device 104 scales the window size in the SYN packet by the scale value before comparing it to the encoded value in the ACK packet.

If it is determined in step 522 that the encoded SYN packet window size value is not greater than the third window size value, then in step 524, the third window size value is left unchanged in the window size field of the first ACK packet.

If it is determined in step 522 that the encoded SYN packet window size value is greater than the third window size value, then in step 526, the third window size value in the window size field of the first ACK packet is overwritten with the encoded SYN packet window size value from step 514 or step 515. For example, network device 104 overwrites the third window size value in the window size field of the first ACK packet with the encoded SYN packet window size value. If a window scale value was encoded by the client or by network device 104 in the SYN packet, then network device 104 scales the encoded window size that was written in the SYN packet by the scale value before writing it in the window size field of the ACK packet. If the scaled value is greater than a maximum window size, then the maximum window size is written in the ACK packet.

In step 528, a second checksum value is calculated for the first ACK packet.

For example, network device 104 calculates the second checksum value for the first ACK packet since the window size value in the window size field of the first ACK packet is modified in step 526.

In step 530, the second checksum value is written in the checksum field of the first ACK packet. For example, network device 104 writes the second checksum value in the checksum field of the first ACK packet.

In step 532, the encoded SYN packet window size from step 514 or step 515 is written in the window size field and a checksum value is calculated for every subsequent ACK packet and written in the checksum field of every subsequent ACK packet. For example, network device 104 writes the first window size value in the window size field and the calculated checksum value in the checksum field of all ACK packets received subsequent to the first ACK packet. In another example, network device 104 writes the first window size value in the window size field and the calculated checksum value in the checksum field of all ACK packets received subsequent to the first ACK packet for a period of time during the front end of a connection lifespan. If a window scale value was encoded by the client or by network device 104 in the SYN packet, then network device 104 scales the encoded window size that was written in the SYN packet by the scale value before writing it in the window size field of the ACK packet. If the scaled value is greater than a maximum window size, then the maximum window size is written in the ACK packet.

5b. Dynamic Window Scale Modification

A SYN packet sent from client 102 to server 108 contains a window size field 316 and may also contain a window scale field 408 if the operating system running on client 102 implements the RFC 1323 window scale option. Most operating systems either don't include the window scale field 408, or encode a value of 0 if window scale field 408 is present, which implies that the window size will not be scaled. Thus, the window size value is used without any scaling for implementations where a window scale value is not specified or if the window scale value is set to 0.

According to a preferred embodiment, network device 104 intercepts TCP SYN packets sent from client 102 to server 108 and if the window scaling option is absent, network device 104 adds window scale field 408, length field 406, window scale option field 404 and padding 402 if required. Network device 104 encodes an optimal window scale value in the added window scale field 408 based on a value encoded by client 102 in window size field 316. If the window scale field 408 is already present and the value encoded in it is sub-optimal, then network device 104 calculates an optimal window size value overwrites the sub-optimal value encoded in window scale field 408 with the calculated optimum window scale value. Optimum window size is given by equation 4 reproduced below:

$$\text{Optimum\_Window\_Size(bytes)} = (\text{Connection\_Speed(bps)}/8) * \text{roundTripDelay(sec)} \quad \text{equation 4}$$

For example, if a maximum possible data rate between client 102 and server 108 is 10 Mbps and roundtrip delay in network 106 is 200 ms then optimum window size is given by:

$$\text{Optimum\_Window\_Size(bytes)} = (10{,}000{,}000/8)*0.2 = 250{,}000 \text{ bytes} \quad \text{equation 7}$$

The optimum window scale value is determined based on the optimum window size calculated by network device 104 and the encoded window size value encoded in window size field 316 of the SYN packet by client 102:

$$\text{Optimum\_Window\_Scale\_Value} = (\text{Optimum\_Window\_Size}/\text{Encoded\_Window\_Size}) \quad \text{equation 8}$$

If the value encoded in window size field 316 is 65,535 bytes, then, the optimum window scale value is given as:

$$\text{Optimum\_Window\_Scale\_Value} = 250{,}000/65{,}535 = 3.8 \quad \text{equation 9}$$

Generally, the window scale value calculated above is a fractional number which is rounded up to the next power of 2 (e.g. 2, 4, 8, 16, etc.), since the value encoded in window scale field 408 has to be a power of 2 multiplier. In the above example, the optimum window scale value of 3.8 is rounded up to 4. Values encoded in window scale field 408 are a power of 2, hence 2 (since $2^2$ is 4) is encoded in window scale field 408. In another example, if encoded window size is 33,304 then the optimum window scale is:

$$\text{Optimum\_Window\_Scale} = 250{,}000/33{,}304 = 7.5 \quad \text{equation 10}$$

In this case the optimum window scale value 7.5 is rounded up to 8, the value encoded in window scale field 408 is 3 (since $2^3$ is 8).

A checksum value for the SYN packet is re-calculated by network device 104 to account for the new optimum window scale value. After the optimum window scale value calculated above is encoded by network device 104 in the window scale field 408 and the checksum value is encoded in the checksum field 318 of the SYN packet 400, SYN packet 400 is forwarded by network device 104 to server 108.

In the present embodiment, processing overhead is incurred only for a TCP SYN packet which is transmitted at the beginning of the connection from client 102 to server 108. Modifying the window scale value only and not the window size value using network device 104 allows the operating system running on client 102 to control the window size value for resource allocation purposes. By modifying the current window size, network device 104 takes advantage of current network conditions in scenarios where connection speed and network latency can change over time. It does not override the decisions being made by newer operating systems that have smart implementations.

FIGS. 6A-B illustrate a flowchart 600 of a method for dynamically modifying a window scale value in a SYN packet using a network device 104 and thereby increasing throughput between a server 108 and a client 102 according to an embodiment of the invention. Flowchart 600 will be described with continued reference to the example operating environment depicted in FIG. 1. In an embodiment, the steps illustrated in FIGS. 6A-B are performed by network device 104 illustrated in FIG. 1. However, the flowchart is not limited to that embodiment. Note that some steps shown in flowchart 600 do not necessarily have to occur in the order shown.

In step 602, a connection rate is determined. For example, network device 104 determines a connection rate between client 102 and server 108.

In step 604, a round-trip delay time is determined. For example, network device 104 determines the round-trip delay time between client 102 and server 108.

In step 606, a first window size is calculated based on the connection rate and the round-trip delay as described above. For example, network device 104 determines the first window size based on the connection rate and round-trip delay time.

In step 608, a SYN packet is received. For example, network device 104 receives a SYN packet from client 102.

In step 610, a second window size value encoded in a window size field of the SYN packet is determined. For example, network device 104 examines the window size field of the header of the SYN packet to determine the second window size value.

In step 612, a first window scale value is determined based on the first window size value and the second window size value as described above. For example, network device 104 determines the first window scale value based on the first window size value determined in step 606 and the second window size value determined in step 610.

The steps of flowchart 600 are continued in FIG. 6B and are described below.

In step 614, it is determined whether a window scaling option is present in the SYN packet. For example, network device 104 determines whether a window scaling option is present in the SYN packet by examining whether the header of the SYN packet has the window scale option field.

If it is determined in step 614 that the SYN packet does not have the window scaling option present, then in step 616, the window scaling option is inserted in the header of the SYN packet. For example, network device 104 inserts the window scale option field 404, length field 406, window scale field 408 and an optional padding field 402 in the header of the SYN packet if it is determined that the window scaling option is not present in the SYN packet.

In step 617, the first window scale value is written in the window scale field that was inserted in step 616 of the SYN packet. For example network device 104 writes the first window scale value in the window scale field of the SYN packet. Control passes to step 624.

If it is determined in step 614 that the SYN packet does have a window scaling option present, then in step 618, it is determined whether the first window scale value is greater than a second window scale value encoded in a window scale field of the SYN packet.

If it is determined in step 618 that the first window scale value is not greater than the second window scale value encoded in the window scale field of the SYN packet, then in step 620, the second window scale value is left unchanged in the window scale field of the SYN packet.

If it is determined in step 618 that the first window scale value is greater than the second window scale value encoded in the window scale field of the SYN packet, then in step 622, the first window scale value is written in the window scale field of the SYN packet.

In step 624, a checksum value is calculated for the SYN packet since the window scale value in the window scale field is changed in steps 622 and 617 or inserted in step 616. For example, network device 104 calculates the checksum value of the SYN packet. In an embodiment, values in a total length field and a header checksum field are recalculated and re-encoded in the IP packet header containing the SYN packet if window scale option field 404, length field 406, window scale field 408 and an optional padding field 402 are inserted in the header of the SYN packet.

In step 626, the checksum value is written in the checksum field of the SYN packet. For example network device 104 writes the checksum value in the checksum field of the SYN packet.

5c. Dynamic Window Size and Window Scale Modification

As described above, a SYN packet sent from client 102 to server 108 contains a window size field 316 and may also contain a window scale field 408 if the operating system on client 102 implements RFC 1323. According to an embodiment of the invention, network device 104 receives a SYN packet and if the encoded window size and window scale values are sub-optimal, network device 104 modifies the encoded values in window size field 316 and/or window scale field 408 by replacing them with optimum values to increase throughput rate between server 108 and client 102. If the window scale field 408 is absent, network device 104 inserts the window scale field 408, length field 406, window scale option field 404 and optional padding field 402 if needed.

For example, if a maximum possible data rate between client 102 and server 108 is 1 Mbps and roundtrip delay in network 106 is 200 ms then optimum window size is:

$$\text{Optimum\_Window\_Size} = (1{,}000{,}000/8)*0.2 = 25{,}000 \text{ bytes} \qquad \text{equation 11}$$

If the encoded window size value in window size field 316 is less than 25,000, then the encoded value is overwritten with optimal window size value 25,000 by network device 104. In this case, a window scale value is not required. If a value other than 0 is encoded in window scale field 408, then it is changed to 0 by network device 104. If it is determined by network device 104 that the encoded window size value in window size field 316 when scaled by a scale factor in window scale field 408 is greater than or equal to the optimal window size, then network device 104 does not modify the values stored in window size field 316 or window scale field 408.

In another example, if a maximum possible data rate between client 102 and server 108 is 10 Mbps and roundtrip delay in network 106 is 200 ms then optimal window size is:

$$\text{Optimum\_Window\_Size} = (10{,}000{,}000/8)*0.2 = 250{,}000 \text{ bytes} \qquad \text{equation 12}$$

In this case, the optimum window size value is larger than the maximum possible window size value. The maximum window size may be protocol dependent, for example, TCP protocol specifies the maximum window size value to be 65,535 since it is limited by the number of bits that can be stored in the window size field. The number of bits that can be stored in the window size field is determined by the protocol in use. Network device 104 determines whether the optimum window size value is greater than the maximum window size value by comparing the optimum window size value to a maximum window size value stored in a memory unit (not shown) of network device 104. In an embodiment, network device 104 may have a table of maximum window sizes corresponding to the network protocol in use. In that case network device 104 can determine which window size to use based on the underlying protocol. For the TCP protocol, if the value to be stored in window size field 316 is greater than 65,535, then it is changed to 65,535 and a window scale value is calculated as:

$$\text{Optimum\_Window\_Scale} = 250{,}000/65{,}535 = 3.8 \qquad \text{equation 13}$$

Network device 104 determines whether the window scale field 408 is present in the SYN packet. If the window scale option is missing then network device 104 inserts and encodes window scale field 408, length field 406, window scale option field 404 and optional padding field 402. If the window scale field 408 is present and the encoded window scale value is larger or smaller than the calculated optimum window scale value, then the optimum window scale value is encoded in window scale field 408. If the encoded value in window scale field 408 is equal to the calculated optimum window scale value then network device 104 does not overwrite the value encoded previously in window scale field 408.

Any ACK packets received by network device 104 subsequent to the SYN packet are examined to determine whether they have a sub-optimal value encoded in window size field 316. If the ACK packets have a sub-optimal window size value, then the window size value encoded in the SYN packet is also encoded in the window size field 316 of the ACK packets. If a window scale value is present in the SYN packet or one was written into the SYN packet, then network device 104 scales the window size in the SYN packet by the scale value before comparing it to the encoded value in the ACK packet. In this case, network device 104 de-scales the encoded window size that was written in the SYN packet by the scale value before writing it in the window size field of the ACK packet. Similar modifications are made to any subsequent ACK packets.

The value in checksum field 318 of the ACK packets is also recalculated to accommodate the change to the value in window size field 316. In an alternate embodiment, network device 104 checks ACK packets coming from client 102 to determine whether the client has decreased the window size value in subsequent ACK packets below a predetermined threshold. If the subsequent ACK packets have a decreased window size value below a predetermined threshold, then network device 104 does not overwrite the window size value encoded in the subsequent ACK packets with the window size value encoded in the SYN packet. This allows client 102 to continue using the window size value for flow control if it desires to do so.

FIGS. 7A-C illustrate a flowchart 700 of a method for dynamically modifying one or both of a window size value and window scale value using a network device and thereby increasing throughput between a server and a client according to an embodiment of the invention. Flowchart 700 will be described with continued reference to the example operating environment depicted in FIG. 1. In an embodiment, the steps illustrated in FIGS. 7A-C are performed by network device 104 illustrated in FIG. 1. However, the flowchart is not limited to that embodiment. Note that some steps shown in flowchart 700 do not necessarily have to occur in the order shown.

In step 702, a connection rate is determined. For example, network device 104 determines a connection rate between client 102 and server 108.

In step 704, a round-trip delay time is determined. For example, network device 104 determines the round-trip delay time between client 102 and server 108.

In step 706, a first window size is calculated based on the connection rate and the round-trip delay as described above. For example, network device 104 determines the first window size based on the connection rate and round-trip delay time.

In step 708, a SYN packet is received. For example, network device 104 receives a SYN packet from client 102.

In step 710, it is determined whether the first window size value calculated in step 706 is greater than a second window size value encoded in a window size field of the SYN packet received in step 708. For example, network device 104 determines whether the first window size value is greater than the second window size value encoded in the window size field of the SYN packet.

If it is determined in step 710 that the first window size value is not greater than the second window size value, then in step 712, the second window size is left unchanged in the window size field of the SYN packet. Control proceeds to step 732.

If it is determined in step 710 that the first window size is greater than the second window size, then in step 714, it is determined whether the first window size is greater than a maximum window size. For example, network device 104 determines whether the first window size is greater than a maximum possible window size value.

In step 714, if it is determined that the calculated first window size is not greater than the maximum window size, then in step 715 it is determined whether a window scaling option is present in the SYN packet. For example, network device 104 determines whether a window scaling option is present in the SYN packet by examining whether the header of the SYN packet has a window scale field.

If it is determined in step 715 that a window scaling option is present, then in step 717 it is determined whether the second window size value scaled by the encoded window scale value is greater than or equal to the optimum calculated first window size value.

If it is determined in step 717, that the second window size value scaled by the encoded window scale value is greater than or equal to the first window size, in step 719 the second window size and encoded window scale values are left unchanged in the window size and window scale fields of the SYN packet. Control proceeds to step 732.

The steps of flowchart 700 are continued in FIG. 7B and are described below.

In step 716, if it is determined in step 714 that the first window size is greater than the maximum window size, a first window scale value is determined based on the first window size value and the maximum window size value. For example, network device 104 determines the first window scale value based on the first window size value determined in step 706 and the maximum window size value.

In step 718, it is determined whether a window scaling option is present in the SYN packet. For example, network device 104 determines whether a window scaling option is present in the SYN packet by examining whether the header of the SYN packet has a window scale field.

If it is determined in step 718 that the SYN packet does not have the window scaling option present, then in step 720, the window scaling option is inserted in the header of the SYN packet. For example, network device 104 inserts the window scale option field, length field, window scale field and an optional padding field in the header of the SYN packet if it is determined that the window scaling option is not present in the SYN packet.

In step 722, the first window scale value is written in the window scale field of the SYN packet. For example network device 104 writes the first window scale value in the window scale field of the SYN packet.

In step 724, the first window size value in the window size field of the SYN packet is overwritten with the maximum window size value. For example, network device 104 overwrites the window size value stored in the window size field of the SYN packet with the maximum window size value.

If it is determined in step 714 that the first window size is not greater than a maximum window size or if it is determined in step 717 that the second window size value scaled by an encoded window scale value is not greater than the first window size, then in step 726, the second window size value in window size field of the SYN packet is overwritten with the first window size value. If a window scale value is present, then it is replaced with a 0. In an example, network device 104 overwrites the second window size value in the window size field of the SYN packet with the first window size value if it is determined that the first window size value is not greater than the maximum window size value or if it is determined that the second window size value scaled by an encoded window scale value is not greater than the first window size.

In step 728, a first checksum value is calculated for the SYN packet. For example, network device 104 calculates the first checksum value for the SYN packet since a window scale option field is inserted and/or a window size value encoded in the window size field of the SYN packet is modified. In an embodiment, values in a total length field and a header checksum field are recalculated and re-encoded in the IP packet header containing the SYN packet if window scale option field 404, length field 406, window scale field 408 and an optional padding field 402 are inserted in the header of the SYN packet.

In step 730, the first checksum value is written in the checksum field of the SYN packet. For example, network device 104 writes the first checksum value in the checksum field of the SYN packet.

In step 732, a first ACK packet is received. For example, network device 104 receives a first ACK packet from client 102.

In step 734, it is determined whether the window size value encoded in the SYN packet is equal to a third window size value encoded in a window size field of the first ACK packet received in step 732. For example, network device 104 determines whether the window size value encoded in the window size field of the SYN packet is equal to the third window size value. If a window scale value was encoded by the client in the SYN packet, then network device 104 scales the window size in the SYN packet by the scale value before comparing it to the encoded value in the ACK packet.

If it is determined in step 734 that the window size value encoded in the SYN packet is equal to the third window size value, then in step 736, the third window size value is left unchanged in the window size field of the first ACK packet.

The steps of flowchart 700 are continued in FIG. 7C and are described below.

If it is determined in step 734 that the window size value encoded in the SYN packet is not equal to the third window size value encoded in the first ACK packet, then in step 740, the third window size value in window size field 316 of the first ACK packet is overwritten with the window size value encoded in the SYN packet. For example, network device 104 overwrites the third window size value in the window size field of the first ACK packet with the window size value encoded in the SYN packet. If a window scale value was encoded by the client or by network device 104 in the SYN packet, then network device 104 scales the encoded window size that was written in the SYN packet by the scale value before writing it in the window size field of the ACK packet. If the scaled value is greater than a maximum window size, then the maximum window size is written in the ACK packet.

In step 742, a second checksum value is calculated for the first ACK packet. For example, network device 104 calculates a second checksum value for the first ACK packet since the window size value in the window size field of the first ACK packet is modified in step 740.

In step 744, the second checksum value is written in the checksum field of the first ACK packet. For example, network device 104 overwrites the checksum value in the checksum field of the first ACK packet with the second checksum value.

In step 746, the window size encoded in the window size field of the SYN packet is written in the window size field and a checksum value is calculated and written in the checksum field of all ACK packets received subsequent to the first ACK packet. For example, network device 104 writes the window size encoded in the window size field of the SYN packet in the window size field and a calculated checksum value in the checksum field of all ACK packets received subsequent to the first ACK packet. If a window scale value was encoded by the client or by network device 104 in the SYN packet, then network device 104 scales the encoded window size that was written in the SYN packet by the scale value before writing it in the window size field of the ACK packet. If the scaled value is greater than a maximum window size, then the maximum window size is written in the ACK packet.

5d. Dynamic Parameter Modification

In an embodiment, network device 104 intercepts a control packet sent from client 102 to server 108. Network device 104 calculates optimal transmission parameters to achieve increased throughput between client 102 and server 108. The transmission parameters may be calculated by network device 104 based on channel characteristics such as connection rate between client 102 and server 108 and roundtrip delay in a network 106. Network device 104 compares the optimum calculated parameters with encoded parameter values in the control packet. If the encoded parameters are sub-optimal, network device overwrites the encoded parameters with the calculated optimum parameters. If the control packet has a checksum field, a new checksum value is calculated and written in the checksum field. It is to be appreciated that subsequent parameters in control packets may also be similarly modified to maintain increased throughput between client 102 and server 108.

FIG. 8 illustrates a flowchart 800 of a method for dynamically modifying one or more parameters in a control packet using a network device thereby increasing throughput between a server and a client according to an embodiment of the invention. Flowchart 800 will be described with continued reference to the example operating environment depicted in FIG. 1. In an embodiment, the steps illustrated in FIG. 8 are performed by network device 104 illustrated in FIG. 1. However, the flowchart is not limited to that embodiment. Note that some steps shown in flowchart 800 do not necessarily have to occur in the order shown.

In step 802, a connection rate is determined. For example, network device 104 determines a connection rate between client 102 and server 108.

In step 804, a round-trip delay time is determined. For example, network device 104 determines the round-trip delay time between client 102 and server 108.

In step 806, a first parameter for increasing throughput is calculated, based on channel characteristics. For example, a first parameter such as optimal window size is determined based on the connection rate and the round-trip delay. In an example, network device 104 determines at least one parameter based on the connection rate and round-trip delay time between client 102 and server 108. In an embodiment a window size value, a window scale value or both are calculated as parameters to increase throughput rate between server and client.

In step 808, a control packet is received. For example, network device 104 receives a control packet, for example a SYN packet or an ACK packet, from client 102.

In step 810, it is determined whether a second parameter value encoded in a first field of the control packet received in step 808 provides for optimal throughput rate between client and server by comparing it to the first parameter value calculated in step 806. For example, it may be determined that if the first parameter is greater than the second parameter then the second parameter is sub-optimal. In an example, network device 104 determines whether a first window size value calculated in step 806 is greater than a second window size value encoded in the window size field of a SYN packet. If it is determined that the second window size value is less than the first window size value, then the second window size value is not optimum.

If it is determined in step 810 that the second parameter value is optimum, then in step 812, the second parameter value is left unchanged in the control packet.

If it is determined in step 810 that the second parameter value encoded in the control packet is not optimum, then in step 814, the second parameter value encoded in the control packet is overwritten with the first parameter value. For example, network device 104 overwrites the second window size value in the window size field of the SYN packet with the first window size value if it is determined that the second window size value is not optimum. In an embodiment more than one parameter encoded in the control packet may be replaced with corresponding optimum parameters calculated in step 806. For example, the window size value and window scale value may be replaced with optimum window size and window scale values.

In step 816, a first checksum value is calculated for the control packet. For example, network device 104 calculates the first checksum value for a SYN or ACK control packet. In embodiments where the control packet does not have a checksum field, this step is not performed.

In step 818, the first checksum value is written in the checksum field of the SYN packet. For example, network device 104 writes the first checksum value in the checksum field of the SYN packet. In embodiments where the control packet does not have a checksum field, this step is not performed.

In step 820, it is determined whether parameters in subsequent control packets are sub-optimal and if they are then they are replaced with optimum parameters. If sub-optimal parameters are replaced with optimal parameters then, if applicable, a checksum value is also calculated and written in the checksum field of the subsequent control packets. In some embodiments, parameters in only a first control packet need to be modified in order to increase throughput between a client and a server throughout a transaction and step 820 is not performed.

5e. DOCSIS Embodiments

In a DOCSIS environment, the downstream channel is shared among all of the cable modems (CM) on a particular channel. In order to keep one particular cable modem from consuming all of the available bandwidth, cable operators generally impose artificial rate limits per cable modem or channel. The rate limits are enforced at the cable modem termination system (CMTS) in the downstream direction. In an embodiment, a cable modem or cable modem termination system is a network device 104 and substitutes the downstream rate limit for the connection rate between client 102 and server 108 when calculating the TCP window size and/or window scale value to be used. Alternatively, network device 104 can calculate the throughput using other means (e.g. ping, etc) in case the downstream rate limit is not the bottleneck.

In DOCSIS 1.1 and beyond, there can be multiple downstream Service Flows, each of which can have a separate rate limit. The cable modem can use its knowledge of the downstream classifiers and Payload Header Suppression (PHS) rules to determine which downstream Service Flow the TCP packets will be sent on, and thus what the downstream connection rate limit between client and server will be. The effects of PHS rules on packet size may be used to determine the connection rate per channel and configure connection parameters such as window size and window scale accordingly. It should be noted that other environments may also impose rate limits below the channel limit and that a similar modification can be made by substituting the imposed rate limit for the connection rate between client and server.

The present invention, or portions thereof, can be implemented in hardware, firmware, software, and/or combinations thereof.

6. Example General Purpose Computer System

The following description of a general purpose computer system is provided for completeness. The present invention can be implemented in hardware, or as a combination of software and hardware. Consequently, the invention may be implemented in the environment of a computer system or other processing system. An example of such a computer system 900 is shown in FIG. 9. The computer system 900 includes one or more processors, such as processor 904. Processor 904 can be a special purpose or a general purpose digital signal processor. The processor 904 is connected to a communication infrastructure 906 (for example, a bus or network). Various software implementations are described in terms of this exemplary computer system. After reading this description, it will become apparent to a person skilled in the relevant art how to implement the invention using other computer systems and/or computer architectures.

Computer system 900 also includes a main memory 905, preferably random access memory (RAM), and may also include a secondary memory 910. The secondary memory 910 may include, for example, a hard disk drive 912, and/or a RAID array 916, and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. As will be appreciated, the removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a PCMCIA slot and card, etc. Software and data transferred via communications interface 924 are in the form of signals 928 which may be electronic, electromagnetic, optical or other signals capable of being received by communications interface 924. These signals 928 are provided to communications interface 924 via a communications path 926. Communications path 926 carries signals 928 and may be implemented using wire or cable, fiber optics, a phone line, a cellular phone link, an RF link and other communications channels.

The terms "computer program medium" and "computer usable medium" are used herein to generally refer to media such as removable storage drive 914, a hard disk installed in hard disk drive 912, and signals 928. These computer program products are means for providing software to computer system 900.

Computer programs (also called computer control logic) are stored in main memory 908 and/or secondary memory 910. Computer programs may also be received via communications interface 924. Such computer programs, when executed, enable the computer system 900 to implement the present invention as discussed herein. In particular, the computer programs, when executed, enable the processor 904 to implement the processes of the present invention. Where the invention is implemented using software, the software may be stored in a computer program product and loaded into computer system 900 using raid array 916, removable storage drive 914, hard drive 912 or communications interface 924.

In other embodiments, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

7. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of dynamically modifying at least one connection parameter between a client and a server connected via a network, thereby increasing throughput rate between said client and said server, comprising:
   (a) determining a connection rate between said client and said server;
   (b) determining a round-trip delay in said network;
   (c) determining a first window size value based on said connection rate and said round-trip delay;
   (d) receiving a first packet from said client;
   (e) determining a second window size value encoded in a window size field of said first packet;
   (f) determining a first window scale value based on said first and second window size values,
   (g) comparing the first window scale value with a second scale value encoded in a window scale field of the first packet; and
   (h) overwriting the second window scale value in the window scale field of the first packet with the first window scale value if the first window scale value is greater than the second window scale value.

2. The method of claim 1, wherein the first packet is a Transmission Control Protocol (TCP) synchronization (SYN) packet.

3. The method of claim 1, further comprising determining whether the first packet has a window scale field.

4. The method of claim 3, further comprising inserting a window scale field in said first packet if said first packet does not have a window scale field.

5. A method of dynamically modifying at least one connection parameter between a client and a server connected via a network, thereby increasing throughput rate between said client and said server, comprising:
   (a) determining a connection rate between said client and said server;
   (b) determining a round-trip delay in said network;
   (c) determining a first window size value based on said connection rate and said round-trip delay;
   (d) receiving a first packet from said client;
   (e) determining a second window size value encoded in said first packet; and
   (f) overwriting the second window size value in the window size field of the first packet with the first window size value if the first window size value is greater than the second window size value.

6. The method of claim 5, wherein the first packet is a Transmission Control Protocol (TCP) synchronization (SYN) packet.

7. The method of claim 6, further comprising overwriting a window size value stored in window size field of acknowledgement (ACK) packets, sent from the client to the server subsequent to the SYN packet, with the first window size value if the window size value encoded in the subsequent ACK packets is greater than a predetermined threshold value.

8. The method of claim 5, wherein the first window size is less than or equal to a maximum window size as prescribed by an operating system and/or networking protocol running on said client.

9. A tangible computer program product comprising a non-transitory computer useable medium including control logic stored therein to dynamically modify at least one connection parameter between a client and a server, connected in a network via a network device, thereby increasing throughput rate between said client and said server, comprising:
   (a) control logic means for causing a processor to determine a connection rate between said client and said server;
   (b) control logic means for causing a processor to determine a round-trip delay in said network;
   (c) control logic means for causing a processor to determine a first window size value based on the connection rate and the round-trip delay;
   (d) control logic means for causing a processor to determine if the first window size value is greater than a second window size value encoded in a window size field of a first packet received from said client; and
   (e) control logic means for causing a processor to determine whether the first window size value is greater than a maximum window size value;
   (f) control logic means for causing a processor to determine a first window scale value based on said first window size value and said maximum window size value if said first window size value is greater than said maximum window size value;
   (g) control logic means for causing a processor to overwrite a second window scale value encoded in a window scale field of said first packet with said first window scale value if said first window scale value is greater than said second window scale value; and
   (h) control logic means for causing a processor to overwrite the second window size value encoded in the window size field of said first packet with the maximum window size value if said maximum window size value is greater than said second window size value.

10. The tangible computer program product of claim 9, wherein the first packet is a Transmission Control Protocol (TCP) synchronization (SYN) packet.

11. The tangible computer program product of claim 9, wherein the round-trip delay is determined by one or more of Internet Control Message Protocol (ICMP) ping, TCP (Transmission Control Protocol) timestamp, network topology or input via a configuration file or web page.

12. The tangible computer program product of claim 9, wherein the connection rate between said client and said server is determined by one or more of network physical parameters and Internet Control Message Protocol (ICMP) ping.

13. The tangible computer program product of claim 9, further comprising control logic means for causing the processor to calculate a checksum value for the first packet and store the checksum value in a checksum field of the first packet.

14. The tangible computer program product of claim 9, wherein the maximum window size is based on a value prescribed by an Operation System and/or networking protocol running on said client.

15. The tangible computer program product of claim 9, wherein determining said first window scale value further comprises determining a ratio of said first window size value and said maximum window scale value and rounding up the ratio to the nearest power of two.

16. The tangible computer program product of claim 9, wherein said rate of said connection is determined by a value encoded in a configuration file received by said network device.

17. The tangible computer program product of claim 9, wherein said connection rate is determined based on one or more of network physical parameters and Internet Control Message Protocol (ICMP) ping.

18. A method of dynamically modifying at least one connection parameter between a client and a server connected via a network, thereby increasing throughput rate between said server and said client, comprising:
   (a) determining a first parameter value based on one or more characteristics of said network and a connection between said client and said server;
   (b) determining whether a second parameter value encoded in a connection parameter field of said first packet received from said client is optimum based on a comparison with said first parameter value; and
   (c) overwriting said second parameter value with said first parameter value in said connection parameter field, if said second parameter value is not optimum, thereby increasing throughput rate between said server and said client.

19. The method of claim 18, wherein said characteristics include a connection rate between said client and said server and a round-trip delay in said network.

20. The method of claim 18, wherein said first and second parameters are window size values.

21. The method of claim 18, wherein said first parameter and second parameters are window scale values.

22. A tangible computer program product comprising a non-transitory computer useable medium including control logic stored therein to dynamically modify at least one connection parameter between a client and a server, connected in a network via a network device, thereby increasing throughput rate between said client and said server, comprising:
   (a) control logic means for causing a processor to determine a connection rate between said client and said server;
   (b) control logic means for causing a processor to determine a round-trip delay in said network;
   (c) control logic means for causing a processor to determine a first window size value based on the connection rate and the round-trip delay; control logic means for causing a processor to determine whether the first window size value is greater than an encoded second encoded window size value scaled by an encoded window scale value if it is determined that the first window size value is greater than the un-scaled second window size value and lesser than a maximum window size value; and
   (d) control logic means for causing a processor to overwrite the second window size value with the first window size value if the second window size value scaled by the encoded window scale value is lesser than the first window size value.

23. The tangible computer program product of claim 22, further comprising control logic means for causing a processor to determine if the first window size value is greater than the second window size value.

24. The tangible computer program product of claim 22, further comprising control logic means for causing a processor to determine whether the first window size value is greater than a maximum window size value if it is determined that the first window size is greater than the second window size value.

25. The tangible computer program product of claim 22, control logic means for causing a processor to overwrite the encoded window scale value with zero.

26. The tangible computer program product of claim 22, wherein the first packet is a Transmission Control Protocol (TCP) synchronization (SYN) packet.

27. The tangible computer program product of claim 22, wherein the maximum window size is based on a value prescribed by an Operation System and/or networking protocol running on said client.

28. A method of dynamically modifying at least one connection parameter between a client and a server connected via a network, thereby increasing throughput rate between said client and said server, comprising:
   (a) determining a first window size value based on a connection rate between said client and said server and a round-trip delay in said network;
   (b) receiving a first packet from said client;
      determining a second window size value encoded in said first packet;
      determining a window scale value encoded in said first packet;
      scaling the second window size value by the encoded scale value;
      determining whether the first window size value is greater than the scaled second window size value;
      de-scaling the first window size value by the encoded scale value if the first window size value is greater than the scaled second window size value; and
      overwriting the second window size value in the window size field of the first packet with the de-scaled first window size value.

29. The method of claim 28, further comprising determining whether a window scale option is present in the first packet.

30. The method of claim 28, wherein the first packet is a Transmission Control Protocol (TCP) synchronization (SYN) packet.

* * * * *